(12) United States Patent
Baeurle et al.

(10) Patent No.: US 11,907,054 B2
(45) Date of Patent: Feb. 20, 2024

(54) MULTI-MODULE SYSTEM WITH SINGLE TERMINAL ERROR FLAG INPUT/OUTPUT

(71) Applicant: Power Integrations, Inc., San Jose, CA (US)

(72) Inventors: Stefan Baeurle, San Jose, CA (US); Michael Yue Zhang, Mountain View, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 0 days.

(21) Appl. No.: 17/845,117

(22) Filed: Jun. 21, 2022

(65) Prior Publication Data

US 2023/0259418 A1    Aug. 17, 2023

Related U.S. Application Data

(60) Provisional application No. 63/311,273, filed on Feb. 17, 2022.

(51) Int. Cl.
    *G06F 11/00* (2006.01)
    *G06F 11/07* (2006.01)
    *H02P 27/06* (2006.01)

(52) U.S. Cl.
    CPC ...... *G06F 11/0775* (2013.01); *G06F 11/0745* (2013.01); *H02P 27/06* (2013.01)

(58) Field of Classification Search
    CPC .... G06F 11/0775; G06F 11/0745; G06F 1/30; H02P 27/06
    See application file for complete search history.

(56) References Cited

U.S. PATENT DOCUMENTS

| | | |
|---|---|---|
| 10,008,942 B1 | 6/2018 | Horwitz et al. |
| 10,181,813 B2 | 1/2019 | Baurle et al. |
| 10,886,870 B2 | 1/2021 | Baurle et al. |
| 10,998,843 B2 | 5/2021 | Baeurle |
| 2004/0136135 A1 | 7/2004 | Takahashi |
| 2014/0265979 A1* | 9/2014 | Xu .................... B60L 50/52 318/478 |

(Continued)

OTHER PUBLICATIONS

European Patent Application No. 22166294.3, Extended European Search Report dated Aug. 23, 2022, 9 pages.

(Continued)

*Primary Examiner* — Joseph D Manoskey
(74) *Attorney, Agent, or Firm* — Pamela Lau Kee; POWER INTEGRATIONS, INC.

(57) ABSTRACT

The system comprises a plurality of driver modules coupled by a fault condition bus, e.g. single-wire bus. Each driver module includes an Error Flag Interface block coupled between a single terminal error flag input/output (EF I/O) and a Control block. Each driver module may be coupled- to a motor. When a driver module detects a local fault condition, its Error Flag Interface block is configured to lower the voltage at the single terminal EF I/O to communicate the change to the other driver modules. The Error Flag Interface block is further configured to monitor voltage changes at its single terminal EF I/O. An external fault condition is detected when the single terminal EF I/O is at a low voltage. The Error Flag Interface block is further configured to send a signal disabling the output of the driver module.

19 Claims, 7 Drawing Sheets

(56) References Cited

U.S. PATENT DOCUMENTS

| | | |
|---|---|---|
| 2016/0248242 A1* | 8/2016 | Petruzzi ............... H03K 17/082 |
| 2017/0134018 A1 | 5/2017 | Imanishi et al. |
| 2018/0123495 A1* | 5/2018 | Bäurle ..................... H02P 6/14 |
| 2018/0302017 A1 | 10/2018 | Baurle et al. |
| 2019/0326897 A1 | 10/2019 | Murakami et al. |
| 2021/0067081 A1* | 3/2021 | Nakazima ............ B62D 5/0487 |

OTHER PUBLICATIONS

PCT Application No. PCT/US2023/060728; International Search Report and Written Opinion of the International Searching Authority; dated May 9, 2023; 16 pages.

\* cited by examiner

MULTI-MODULE SYSTEM WITH SINGLE TERMINAL ERROR FLAG INPUT/OUTPUT

This application claims the benefit of U.S. Provisional Application No. 63/311,273, filed Feb. 17, 2022, which is incorporated in its entirety herein by reference.

BACKGROUND

Field of the Invention

The present invention relates generally to systems of multiple electronic switching modules that use a single-wire bus between the switching modules for fault condition management. More specifically, it relates to half-bridge inverter modules that may be used in such systems for multi-phase brushless dc (BLDC) or synchronous permanent magnet motor drives.

Household and industrial appliances such as ventilation fans, cooling systems, refrigerators, dishwashers, washer/dryer machines, and many other large household products/goods use electric motors that transfer energy from an electrical source to a mechanical load. Electrical energy for driving the electric motors is provided through a drive system, which draws electrical energy from an electrical source (e.g., from an ac low frequency source). The electrical energy received from the electrical source is first processed through a power converter, and then converted to a desired form of electrical energy (typically a dc voltage) that is supplied to the motor through a system of drivers that typically includes two or more dc-ac inverters. The inverters are operated by a system controller to achieve the desired mechanical output. The desired mechanical output of the motor may be a mechanical operating parameter, e.g. the speed of the motor, the torque, or the position of a motor shaft.

Motors and their related circuitries such as motor drives represent a large portion of utility network loads. The functionality, efficiency, size, and price of motor drives are challenging and competitive factors that suppliers of these products consider. The motor drive system provides the input electrical signals to the motor such as voltage, current, frequency, and phase for a desired mechanical output. A motor drive system typically includes multiple driver modules. A driver module in one example may include an inverter that receives a dc input to produce an ac output of desired voltage, current, frequency, and phase. A system controller is typically a digital processor (sometimes referred to as a microcontroller unit or MCU) that receives low-power signals from the driver modules or from dedicated external sensors to produce the desired mechanical output. The system controller may compare the sensed values to the desired values and may adjust the operation of the drivers to maintain the target output of the motor. The system controller may also receive information from the driver modules via a digital communication bus that provides status information about the drivers or other information useful for management of the system.

An important consideration for any system that controls a motor is the safety of users in the event of a fault condition. Such systems generally must undergo rigorous testing by regulatory agencies before they are certified for sale. Systems that rely on the MCU system controller to manage fault conditions typically must repeat the safety certification testing whenever there is any change to the programming of the MCU, even if the change is unrelated to the handling of a fault condition. It is desirable for systems to have the ability to respond safely to fault conditions independently of the system controller.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
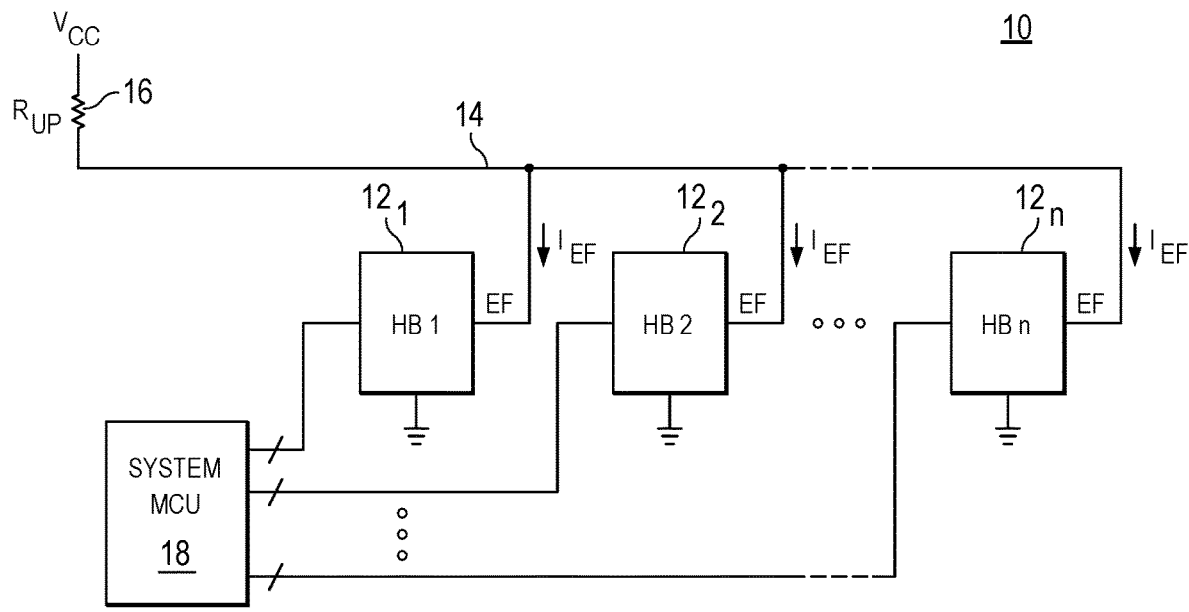
FIG. 1 illustrates an embodiment of the system 10. For a plurality of driver modules $12_n$, each driver module is coupled to ground and has an Error Flag (EF) output.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off state", or "off", the transistor does not substantially conduct current. Conversely, when a transistor is in an "on state", or "on", the transistor is able to substantially conduct current. By way of example, in one embodiment, a high-voltage transistor comprises an N-channel metal-oxide-semiconductor (NMOS) field-effect transistor (FET) with the high-voltage being supported between the first terminal, a drain, and the second terminal, a source. The high voltage metal-oxide-semiconductor field-effect transistor (MOSFET) may comprise a power switch that is driven by an integrated controller circuit to regulate energy provided to a load. In another embodiment, the high voltage transistor comprises a normally on GaN device in series with a normally off, low-voltage metal-oxide-semiconductor (MOS) FET. For purposes of this disclosure, "ground" or "ground potential" refers to a reference voltage or potential against which all other voltages or potentials of an electronic circuit or an integrated circuit (IC) are defined or measured.

Half-bridge inverter modules are typically coupled to drive a motor, e.g. single phase motor or a 3-phase motor, in response to a system controller. The power switching block of each half-bridge inverter module may include a high side switch coupled to a low side switch, with a mid-point terminal between the high side switch and the low side switch coupled to a respective terminal of the motor.

The system comprises a plurality of driver modules connected by a fault condition bus, e.g. a single-wire bus. Each driver module includes a Control block and an Error Flag Interface block. The Control block may include a multitude of conventional and known electronic circuits that perform specialized tasks essential to the desired operation of the driver module. For example, the Control block may include reference circuits to generate and maintain reference voltages and reference currents, sensing circuits to sense voltages on terminals and currents in transistor switches, comparator circuits to detect when parameters are above or below limits, thermal circuits to determine the temperature of components on the module, logic circuits to determine if a local fault occurs in the module, digital communication circuits to communicate with a system microcontroller, error detection circuits to receive error signals in response to signals transmitted from external modules, test circuits to determine proper operation of subcircuits on the module, driver circuits to operate output transistors, and shutdown circuits to prevent the output of the module from switching. The Error Flag Interface block has a single terminal Error Flag Input/Output (EF I/O) that connects to the single-wire bus. The driver module may have an inverter output HB connected to a motor.

Error detection circuits in the Control block are configured to detect a local fault condition, and logic circuits in the Control block are configured to generate an ERROR_LOCAL signal when the driver module detects a local fault condition. A local fault condition, as distinguished from an external fault condition, is one detected by the driver module. When the Error Flag Interface block receives the ERROR_LOCAL signal, the single terminal error flag I/O is configured to change the state of the single-wire bus from a first logic state (indicating no error) to a second logic state (indicating an error).

The Error Flag Interface block is further configured to receive an external error flag signal from the single-wire bus. The external flag signal indicates an external fault condition, e.g. one that is detected outside the driver module. When the external flag signal is in a second logic state, an external fault condition has been detected. When the external flag signal is in a first logic state, the external fault condition has been removed indicating that the receiving driver module may be reset.

For each driver module, when the single terminal error flag I/O receives the external error flag signal in a second logic state, the Error Flag Interface block locally transmits an ERROR signal to the Control block to trigger shutdown circuits in the Control block that cause the driver module to stop switching its inverter output HB. When the state of the external error flag signal changes from a second logic state to a first logic state, the Error Flag Interface block locally transmits a switch signal to trigger logic circuits in the Control block of the driver module to resume normal operation. Alternately, the Error Flag Interface block may locally transmit the switch signal to trigger the motor to begin normal operation when a user defined condition has been met.

The local fault conditions are selected from a group that includes over-current, over-voltage, and over-temperature.

The driver module may be a half-bridge inverter integrated circuit in a 3-phase motor drive configuration, a half-bridge inverter integrated circuit in an H-bridge configuration for a single-phase motor drive, or an assembly of multiple components that includes a smart device (e.g. driver and power switch) in a single package. The system may include multiple motors that use multiple driver modules.

FIG. 1 illustrates an embodiment of the system 10. For a plurality of half-bridge inverters $12_n$, each half-bridge inverter is coupled to ground and has a single terminal Error Flag Input/Output flag EF I/O. Each single terminal EF I/O is electrically coupled to a fault condition bus, e.g. single-wire bus 14. A pull-up resistor RUP 16 is electrically coupled to system voltage $V_{CC}$ and the single-wire bus 14. A System MCU 18 is electrically coupled to each of the plurality of half-bridge inverters $12_n$.

In operation, for each half-bridge inverter, the state of the single terminal EF I/O enables simple inter-module communication in the event that one of the half-bridge inverters $12_n$ detects a local fault condition. This local fault condition usually requires the half-bridge inverter $12_n$ to stop switching its output.

The system 10 uses an open drain architecture with a controlled pull-down capability using a current sink and requires a pull-up resistor RUP coupled to system $V_{CC}$. The voltage on the single-wire bus falls when current removed from the single-wire bus exceeds the current that the voltage $V_{CC}$ can provide through the pull-up resistor RUP.

In one embodiment, when the half-bridge inverter detects a local fault condition, e.g. over-temperature, over-voltage, or over-current, it inhibits switching by pulling the single terminal EF I/O to a logic low state level VEFL, thereby lowering the voltage on the single-wire bus 14 and setting the state on all of the single terminal EF I/Os in the system to VEFL. In response, the half-bridge inverters will stop switching. In one embodiment, the half-bridge inverter sets an internal fault latch to make the inhibited switching permanent until the single terminal EF I/O is reset. The internal fault latch may be set by fault conditions that include a Low Side (LS) MOSFET over-temperature protection latching shutdown, line over-voltage, and a LS MOSFET sustained over-current protection latching shutdown.

The local fault conditions may be defined by the user. By way of illustration, these conditions may include a selection between either hysteretic or latching shutdown protection modes for conditions of over-current and over-temperature.

In one embodiment, resetting the single terminal EF I/O occurs when either the local fault condition has cleared or is below a predetermined threshold. As a result, the affected half-bridge inverter releases the single terminal EF I/O (stops pulling current from the single-wire bus) which raises the voltage on the single-wire bus 14, thereby changing the state on each single terminal EF I/O in the system to VEHL. In response, the half-bridge inverter will resume normal operation and reset its internal fault latch.

In another embodiment, resetting the single terminal EF I/O occurs when the half-bridge inverter receives an external signal to reset. To reset the single terminal EF I/O, an external source may pull the single terminal EF I/O to a logic high state level VEFH. A rising edge at the single terminal EF I/O raising the voltage above the logic high state level VEFH resets the internal fault latch (not shown) for each half-bridge inverter connected to the single-wire bus 14.

Figure 2:
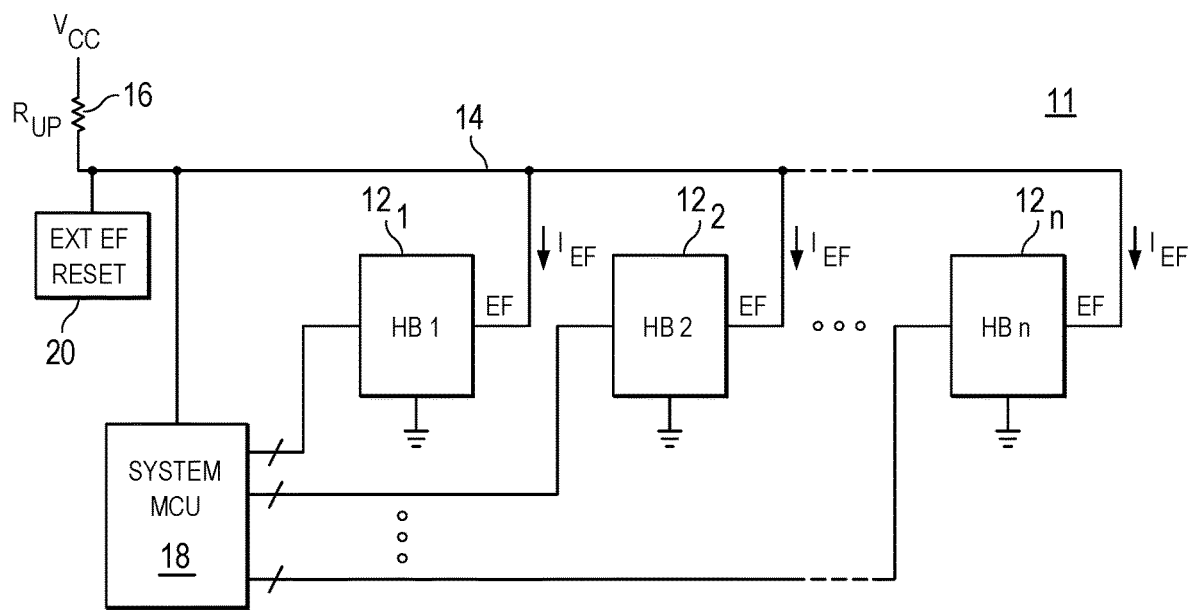
FIG. 2 illustrates another embodiment of the system 10 that includes an external error flag reset.

FIG. 2 illustrates another embodiment of the system 11. For a plurality of half-bridge inverters $12_n$, each half-bridge inverter is coupled to ground and has a single terminal EF I/O. Each single terminal EF I/O is electrically coupled to a single-wire bus 14. A pull-up resistor RUP 16 is electrically coupled to system $V_{CC}$ and the single-wire bus 14. A System MCU 18 is electrically coupled to each of the plurality of half-bridge inverters $12_n$ and to the EXT EF Reset circuit 20, which is coupled to the single-wire bus 14. The system 10 may be reset externally through the EXT EF RESET circuit 20 or via the System MCU 18.

Applying a reset signal, EX EF Reset circuit 20 injects a current $I_{RES}$ greater than the maximum single terminal EF I/O pull-down current $I_{EF}(MAX)$ and forces the single terminal EF I/O of each of the half-bridge inverters to go high, which in turn resets their respective internal latches.

In another embodiment, the System MCU 18 sends a latch reset command some time after the affected half-bridge inverter has pulled its respective single terminal EF I/O to logic low. For each half-bridge inverter, the single terminal EF I/O is forced to logic HIGH, which in turn resets its respective internal latch.

Figure 3:
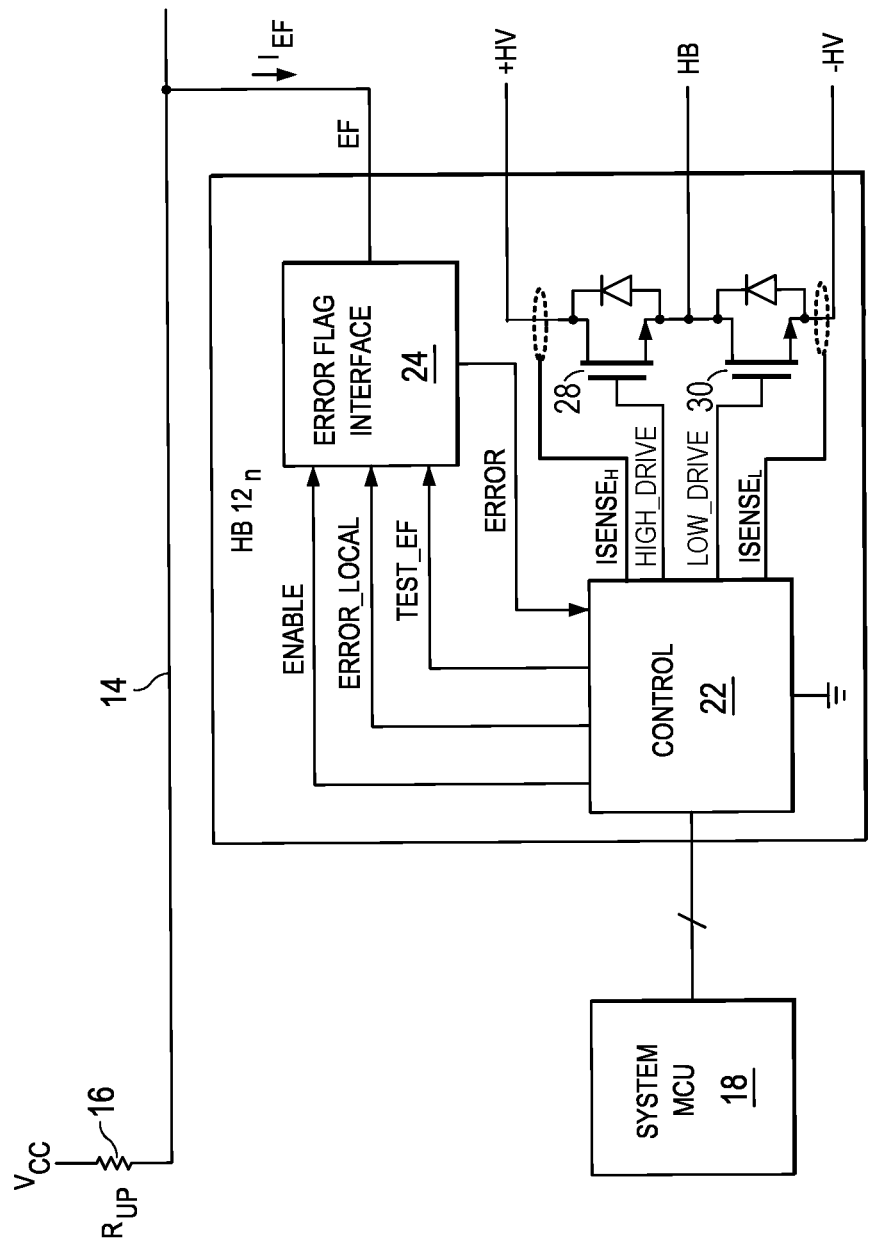
FIG. 3 is a functional block diagram for a driver module, e.g. half-bridge inverter $12_n$, configured according to FIG. 1.

FIG. 3 is a block diagram for a half-bridge inverter $12_n$ configured according to FIG. 1. The half-bridge inverter $12_n$, includes an Error Flag Interface block 24 having a single terminal EF I/O connected to circuits in a Control block 22. The circuits in Control block 22 are further connected to driving circuits that provide an inverter output signal HB. The driving circuits drive two switches 28, 30 sharing a common node at the output of the half-bridge inverter. The switches are electrically connected between a high voltage source+HV and a low voltage source −HV. Current monitor circuits in Control block 22 measure the currents in the switches coupled between the high voltage source+HV and the low voltage source −HV from the respective current sense signals $ISENSE_H$ and $ISENSE_L$. The inverter output HB for the half-bridge driver is at the midpoint between the two switches 28, 30. The Error Flag Interface block may be enabled when logic circuits in the Control block 22 send the ENABLE signal to the Error Flag Interface block 24.

The half-bridge inverter may be part of a 3-phase motor drive or part of a single phase motor drive in an H-bridge configuration. Many half-bridge inverters that drive many different motors in a system may share the single-wire bus.

When a local fault condition is detected or when the EF detection feature is tested by assertion of a TEST_EF signal, logic circuits in the Control block 22 send an ERROR_LOCAL signal to the Error Flag Interface block 24. The Error Flag Interface block 24 pulls the single terminal EF I/O to a logic low VEFL.

For an external fault condition, when the Error Flag Interface block 24 detects that the single terminal EF I/O is at a logic low VEFL, an ERROR signal is sent to logic circuits in the Control block 22 to disable the switching of the driving circuit. In one embodiment, the assertion of the ERROR signal may configure logic circuits in the Control block 22 to ignore signals from the System MCU.

Figure 4:
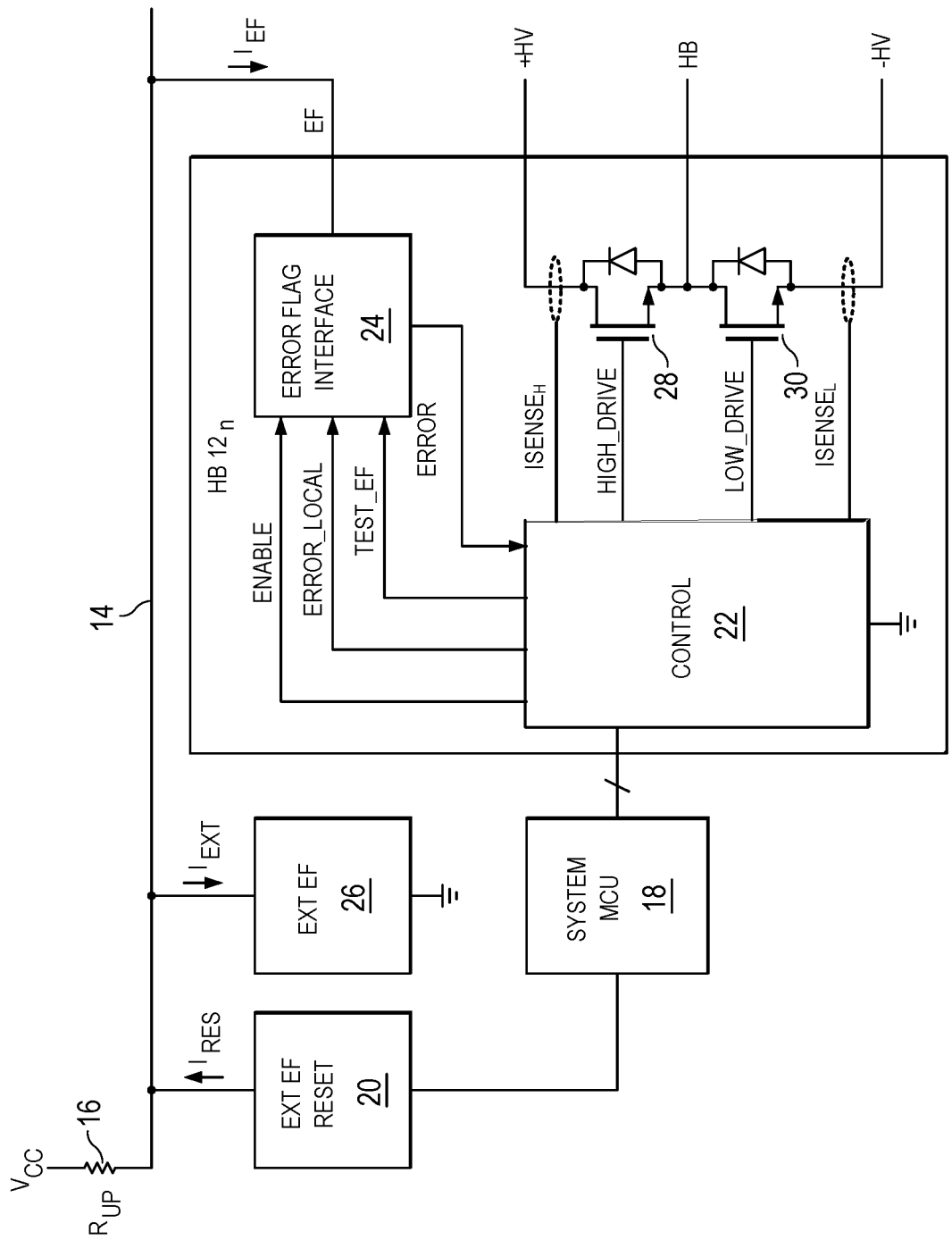
FIG. 4 is a functional block diagram for the half-bridge inverter $12_n$ configured according to FIG. 2.

FIG. 4 is a functional block diagram for the half-bridge inverter $12_n$ configured according to FIG. 2. The EXT EF RESET block 20 and EXT EF block 26 are electrically coupled to the single terminal EF I/O of the half-bridge inverter $12_n$.

In operation, when the EXT EF RESET block 20 injects a current $I_{RES}$ greater than the maximum single terminal EF I/O pull-down current $I_{EF}(MAX)$. The single terminal EF I/O of each of the half-bridge inverters then goes high, which in turn resets their respective internal latches.

In operation, when the EXT EF block 26 lowers the voltage of the single-wire bus to a logic level low VEFL, the single terminal EF I/O of each of the half-bridge inverters goes low, which in turn disables their respective driving circuits.

Figure 5:
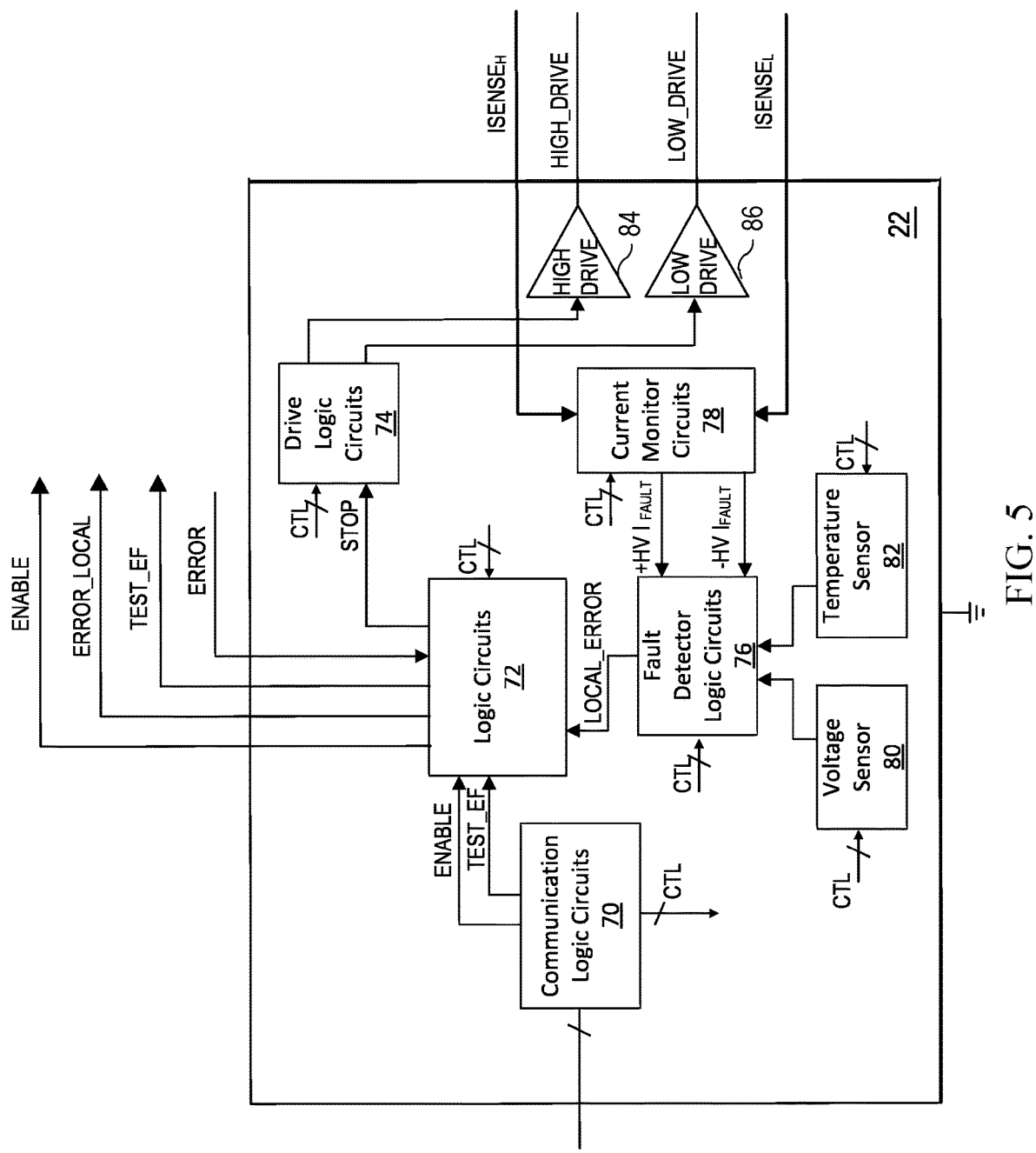
FIG. 5 is a block diagram for the control block 22 configured according to FIG. 3.

FIG. 5 is an example block diagram for the control block 22 configured according to FIG. 3. In the example of FIG. 5, the Communication Logic Circuits 70 are connected to System MCU 18 (shown in FIG. 2) and provide the outputs ENABLE and TEST_EF to the Logic Circuits 72. The Drive Logic Circuits 74 are connected between the Logic Circuits 72 and the driver circuits 84, 86. The High Drive Circuit 84 provides the High_Drive signal while the Low Drive Circuit 86 provides the Low_Drive signal.

The Fault Detector Logic Circuits connect between Logic Circuits 72 and the sensors 80, 82. The Voltage Sensor 80 may provide an output indicative of an over-voltage or an under-voltage fault condition for voltages that may be internal or external to the module, depending how the module is configured in the motor drive system. The Temperature Sensor 82 provides an output indicative of an over-temperature fault condition. The Current Monitor Circuits 78 connect between the Fault Detector Logic Circuits 76 and the current sensing signals $ISENSE_H$ and $ISENSE_L$. The Current Monitor Circuits 78 provide outputs, +HV $I_{FAULT}$ and −HV$_{IFAULT}$. +HV $I_{FAULT}$ indicates an over-current fault condition related to current taken from the high voltage source+HV. −HV $I_{FAULT}$ indicates an over-current fault condition related current delivered to the low voltage source −HV.

The Fault Detector Logic Circuits 76 provide an output LOCAL_ERROR indicative of the local fault conditions to the Logic Circuits 72. The Logic Circuits 72 provide the outputs ENABLE, ERROR_LOCAL, TEST_EF to the Error Flag Interface 24 (shown in FIG. 3).

The Error Flag Interface block provides an input ERROR signal to the Logic Circuits 72. An asserted ERROR signal indicates an external fault condition. The Logic Circuits 72 further provide an output STOP signal to the Drive Logic Circuits 74 which will provide signals to the drive circuits 84, 86 to stop the switching of the inverter output.

Figure 6:
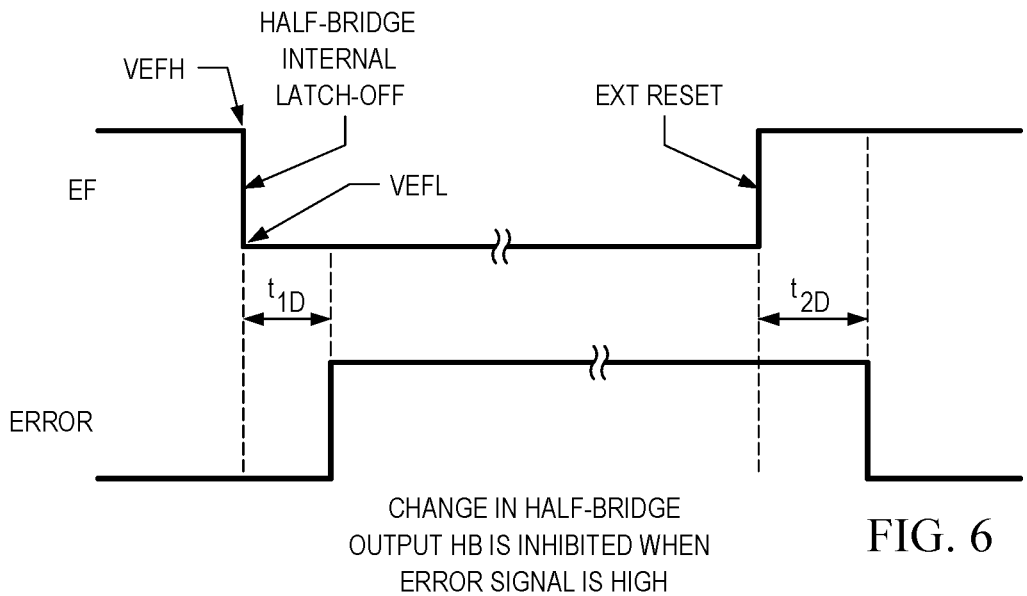
FIG. 6 is an Error Flag timing diagram that illustrates the delay times tip and $t_{2D}$ (typically 10 µs) acting as a deglitch function.

FIG. 6 is an Error Flag timing diagram illustrating the delay times $t_{1D}$ and $t_{2D}$ (for example 10 μs) that may provide a deglitch function for the response to an external ERROR. The deglitch function may avoid false alarms that might otherwise result from noise on the single-wire bus. Any intervention of the System MCU 18 for the Error Flag function is not required as illustrated in the embodiment of FIG. 1. However, it may optionally connect to the Error Flag terminal for monitoring purposes or to reset the latches as in the embodiment of FIG. 2.

Initially, the single terminal EF I/O is at a logic high state VEFH. In response to detecting that the single terminal EF I/O has changed to a logic low state VEFL (indicative of an external error), the Error Flag Interface block asserts an ERROR signal that disables its respective driving circuit. When the single terminal EF I/O changes to a logic high state VEFH, the affected half-bridge inverter de-asserts the ERROR signal allowing its respective driving circuit to resume operation.

Figure 7:
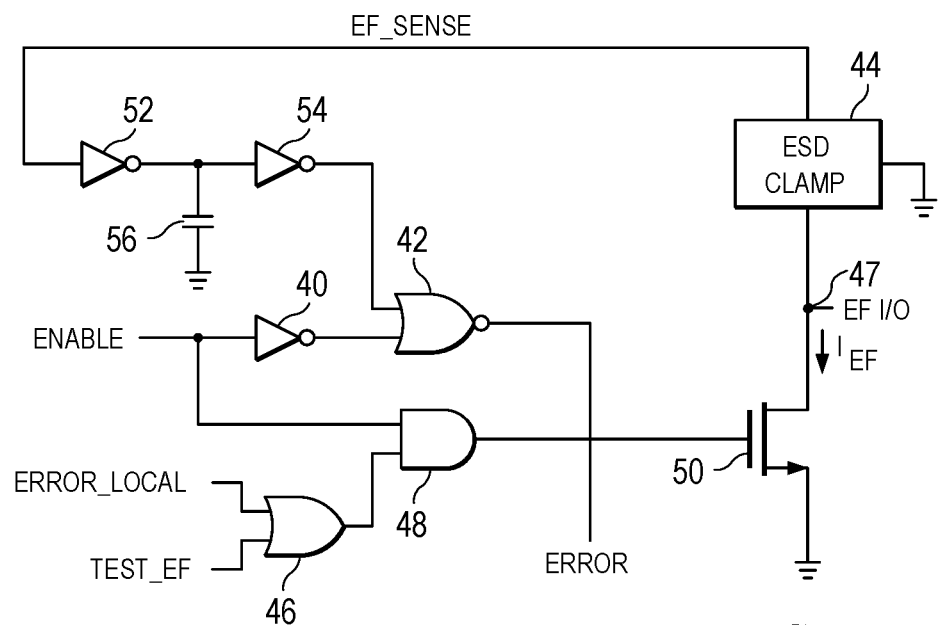
FIG. 7 is a logic diagram corresponding to the Error Flag Interface block 24 that is included in each half-bridge inverter $12_n$.

FIG. 7 is logic diagram corresponding to the Error Flag Interface block 24 that is included in each half-bridge inverter $12_n$.

TEST_EF and ERROR_LOCAL signals are inputs to OR gate 46. The output of OR gate 46 and the ENABLE signal are inputs to AND gate 48. The drain of transistor 50 is connected to the single terminal EF I/O 47. The output of the AND gate 48 is connected to the gate of transistor 50. The source of transistor 50 is connected to ground.

An optional ESD Clamp circuit 44, connected between the single terminal EF I/O 47 and ground, delivers an EF_SENSE signal that is indicative of the voltage state on the single terminal EF I/O 47. ESD Clamp circuit 44 limits the magnitude of the EF_SENSE signal to protect the logic circuits from damage from excessive voltage that may appear on the single-wire bus. A first delay inverter 52 and a second delay inverter 54 are electrically in cascade. A capacitance 56 is connected at the midpoint between the first and second delay inverters 52, 54 and ground. The EF_SENSE signal is an input to the first delay inverter 52. The output of the second delay inverter 54 is a delayed EF_SENSE signal.

The ENABLE signal is received by an inverter 40. The delayed EF_SENSE signal and the inverted ENABLE signal are inputs to a NOR gate 42. The output of the NOR gate 42 is an ERROR signal that is indicative of an external fault condition.

Figure 8:
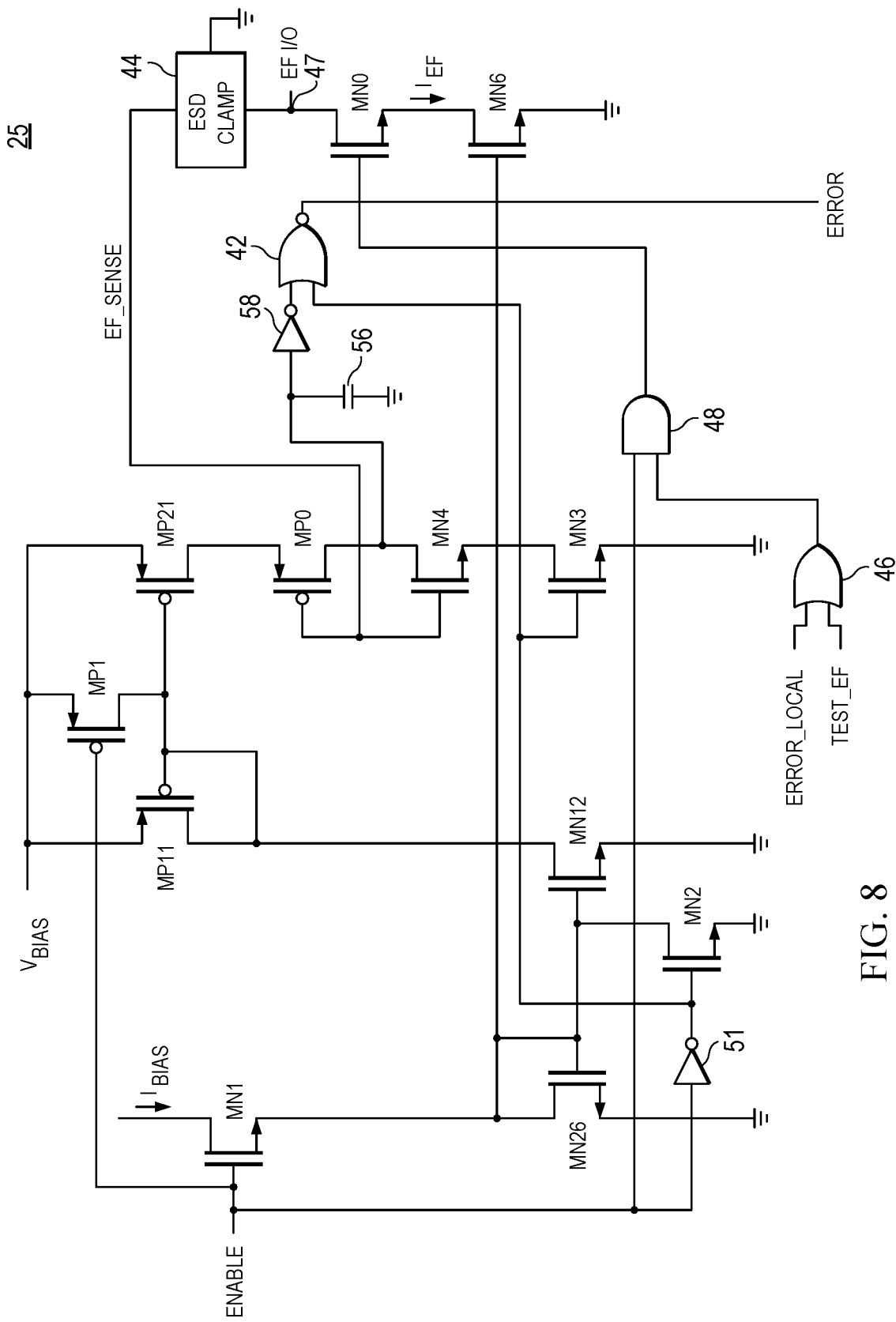
FIG. 8 is an embodiment of a circuit implementation of the Error Flag Interface block 25 shown in FIG. 7.

FIG. 8 is an embodiment of a circuit implementation of the Error Flag Interface block 25 shown in FIG. 7.

nFET MN1 has a drain receiving a bias current $I_{BIAS}$, a gate receiving an ENABLE signal, and a source. nFET MN26 has a drain and a gate connected to the source of nFET MN1, and a source connected to ground.

pFET MP11 has a source connected to a bias voltage $V_{BIAS}$. The gate and drain of pFET MP11 are electrically connected. nFET MN12 has a drain connected to the gate and drain of pFET MP11, a gate connected to the gate of nFET MN26, and a source connected to ground. nFET MN2 has a drain connected to the gate of nFET MN12, a gate connected to an output of an inverter 51, and a source connected to ground.

pFET MP1 has a source connected to the bias voltage $V_{BIAS}$, a gate receiving the ENABLE signal, and a drain connected the gate and drain of pFET MP11.

pFET MP21 has a source connected to the bias voltage $V_{BIAS}$, a gate connected to the gate and drain of pFET MP11, and a drain. pFET MP0 has a source connected to the drain of pFET MP21, a gate receiving the EF_SENSE signal, and a drain. nFET MN4 has a drain connected to the drain of pFET MP0, a gate receiving the EF_SENSE signal, and a source. nFET MN3 has drain connected to the source of nFET MN4, a gate connected to the gate of MN2, and a source connected to ground.

An OR gate 46 receives the ERROR_LOCAL signal and the TEST_EF signal. An AND gate 48 receives the output of the OR gate 46 and the ENABLE signal.

The drain of nFET MN4 is an input to the inverter 58. The capacitance 56 connects between the input of inverter 58 and ground. The output of inverter 58 is a delayed EF_SENSE signal. The delayed EF_SENSE signal and the inverted ENABLE signal are inputs to a NOR gate 42. The output of the NOR gate 42 is an ERROR signal that is indicative of an external fault condition.

An optional ESD Clamp circuit 44, connected between the single terminal EF I/O, ground, and the gate of MP0, delivers an EF_SENSE signal that is indicative of the voltage state on the single terminal EF I/O. ESD Clamp circuit 44 limits the magnitude of the EF_SENSE signal to protect the logic circuits from damage from excessive voltage that may appear on the single-wire bus.

nFET MN0 has a drain connected to the single terminal EF I/O, a gate connected to the output of AND gate 48, and source. nFET MN6 has a drain connected to the source of nFET MN0, a gate connected to the source of nFET MN1, and a source connected ground.

In operation, the single terminal EF I/O is an open drain directly connected to the single-wire bus 14. When a local error is detected by error detection circuits in Control block 22, the ERROR_LOCAL signal will be high, thereby turning on transistor nFET MN0 and pulling the single terminal EF I/O to a logic low state level VEFL with a current $I_{EF}$ that is proportional to current $I_{BIAS}$.

The EF_SENSE signal is high during normal operation and is low when a signal indicating an external fault condition, e.g. external device EF control or control from System MCU 18 is detected. When the EF_SENSE signal is low, the ERROR signal is asserted to cause the inverter to stop switching its output. When the EF_SENSE signal is high, the ERROR signal is de-asserted to cause the inverter to resume switching its output.

Figure 9:
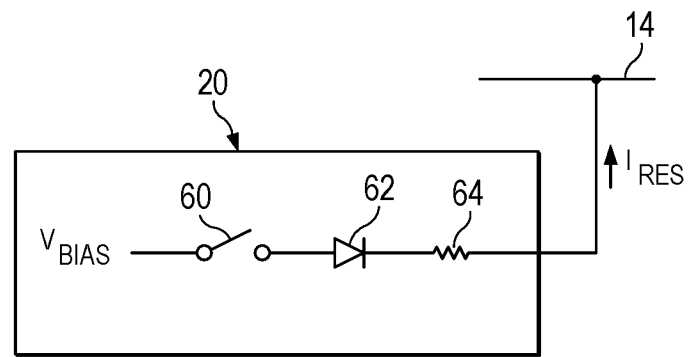
FIG. 9 is a circuit diagram corresponding to the EXT EF RESET block 20 shown in FIG. 2.

FIG. 9 is a circuit diagram corresponding to the EXT EF Reset block 20 shown in FIG. 2. A switch 60 receives the bias voltage $V_{BIAS}$. The anode of diode 62 receives the output of the switch 60. A resistor 64 connects between the cathode of the diode 62 and the single-wire bus 14. In operation, closing switch 60 injects a current $I_{RES}$ into the single-wire bus 14. The current $I_{RES}$ is higher than the single terminal EF I/O pull-down current capability $I_{EF(MAX)}$, raising the voltage on the single-wire bus 14 to force a latch reset.

Figure 10:
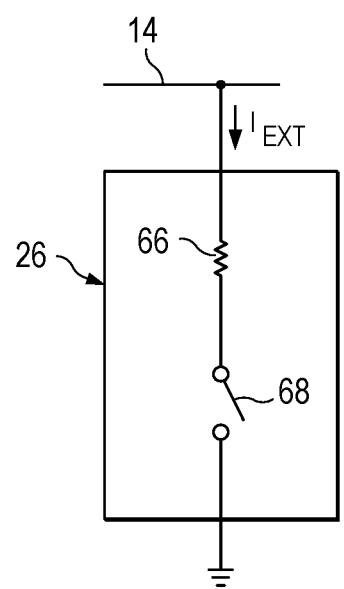
FIG. 10 is a circuit diagram corresponding to the EXT EF block 26 shown in FIG. 4.

FIG. 10 is a circuit diagram corresponding to the EXT EF block 26 shown in FIG. 4. A resistor 66 electrically connects to the single-wire bus 14. A switch 68 connects between resistor 66 and ground. Closing the switch 68 pulls current $I_{EXT}$ from the single-wire bus 14 to assert an external error flag signal.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

To illustrate, while the embodiments describe driver modules connected to a fault condition bus, any circuitry having a single terminal EF I/O can be used with the fault condition bus. The driver modules. Although the exemplary embodiments therein described a driver module that is a half-bridge inverter integrated circuit in a 3-phase motor drive configuration, the driver module may be a half-bridge inverter integrated circuit in an H-bridge configuration for a single-phase motor drive or a smart device (e.g. driver and power switch) in a single package. The system may include multiple motors that use multiple driver modules.

Although the present invention is defined in the claims, it should be understood that the present invention can alternatively be defined in accordance with the following examples:

Example 1. A driver module comprising: an error flag interface block having a single terminal error flag input/output (EF I/O); and a control block coupled to the error flag interface block, wherein the control block configures the error flag interface block to respond to a signal indicative of a fault condition, wherein the control block configures the error flag interface block to inhibit the switching of an output of the driver module when the fault condition is detected external to the driver module, the fault condition indicated by an error flag state on the single terminal EF I/O, and wherein the control block configures the error flag interface block to set an error flag state on the single terminal EF I/O when the fault condition is detected local to the driver module.

Example 2. The driver module of Example 1, wherein the local fault condition is selected from the group consisting over-current, over-voltage, and over-temperature.

Example 3. The driver module of Example 1, wherein the error flag interface block is configured to respond to a reset state on the single terminal EF I/O and coupled to the control block to allow the output of the driver module to switch.

Example 4. The driver module of Example 1, wherein the driver module is a half-bridge inverter.

Example 5. The driver module of Example 1, wherein the driver module is a 3-phase motor drive inverter.

Example 6. The driver module of Example 1, wherein the driver module is a driver and power switch in a single package.

Example 7. A system comprising: at least one driver module comprising, an error flag interface block having a single terminal error flag input/output (EF I/O), and a control block coupled to the error flag interface block, wherein the control block configures the error flag interface block to respond to a fault condition, wherein control block configures the error flag interface block to inhibit the operation of the driver module when the fault condition is detected external to the driver module, the fault condition indicated by an error flag state on the single terminal EF I/O, wherein the control block configures the error flag interface block to set an error flag state on the single terminal EF I/O when the fault condition is detected local to driver module; and a fault condition bus is coupled to the single terminal EF I/O of the driver module.

Example 8. The system as in claim 7, wherein the fault condition bus is a single wire bus.

Example 9. The system of claim 7, wherein the local fault condition is selected from the group consisting of over-current, over-voltage, and over-temperature.

Example 10. The system of claim 7, wherein the error flag interface block is configured to respond to a reset state on the single terminal EF I/O and coupled to the control block to allow the output of the driver module to switch.

Example 11. The system of claim 10, further comprising a system controller coupled to the fault condition bus, the system controller configured to set the reset state and to receive the error flag state.

Example 12. The system of claim 7, wherein the driver module is a half-bridge inverter.

Example 13. The system of claim 7, wherein the driver module is a 3-phase motor drive inverter.

Example 14. The system of claim 7, wherein the driver module is a driver and power switch in a single package.

Example 15. A method for error reporting comprising: coupling a driver module having a single terminal EF I/O to a fault condition bus; responding to a fault condition indicated by an error flag interface block of the driver module; configuring an error flag interface block to inhibit switching of an output of the driver module when the fault condition occurs external to the driver module; and configuring the error flag interface block to assert an error flag state on the single terminal EF I/O when the fault condition is detected local to the driver module.

Example 16. The method of claim 15, wherein the local fault condition is selected from the group consisting of over-current, over-voltage, and over-temperature.

Example 17. The method of claim 15, further comprising: configuring the error flag interface block to respond to a reset state of the error flag; and coupling the error flag interface block to the control block to allow the output of the driver module to switch.

Example 18. The method of claim 17, further comprising: receiving the error flag state by a system controller coupled to the fault condition bus; and setting a reset state on the single terminal EF I/O of the driver module by the system controller.

Example 19. The method of claim 17, further comprising: responding to a removal of the local fault condition; and deasserting the error flag state of the single terminal EF I/O by the half-bridge inverter, wherein the deasserting the error flag state corresponds to the reset state.

What is claimed is:

1. A driver module comprising:
    an error flag interface block having a single terminal error flag input/output (EF I/O); and a control block coupled to the error flag interface block,
        wherein the control block is coupled to enable the error flag interface block to respond to a signal indicative of a fault condition,
        wherein the control block is coupled to inhibit the switching of an output of the driver module when in response to the detection of the fault condition external to the driver module by the error flag interface block, the fault condition indicated by an error flag state on the single terminal EF I/O, and
        wherein the control block is coupled to control the error flag interface block to set an error flag state on the single terminal EF I/O in response to the detection of the fault condition local to the driver module.

2. The driver module of claim 1, wherein the fault condition local to the driver module is selected from the group consisting of over-current, over-voltage, and over-temperature.

3. The driver module of claim 1, wherein the error flag interface block is coupled to respond to a reset state on the single terminal EF I/O and coupled to the control block to allow the output of the driver module to switch.

4. The driver module of claim 1, wherein the driver module is a half-bridge inverter.

5. The driver module of claim 1, wherein the driver module is a 3-phase motor drive inverter.

6. The driver module of claim 1, wherein the driver module is a driver and power switch in a single package.

7. A system comprising:
a fault condition bus; and
at least one driver module coupled to the fault condition bus, the at least one driver module further comprising,
an error flag interface block comprising a single terminal error flag input/output (EF I/O), wherein the single terminal EF I/O is coupled to the fault condition bus, and
a control block coupled to the error flag interface block, wherein the control block is coupled to enable the error flag interface block to respond to a fault condition,
wherein control block is coupled to inhibit the operation of the driver module in response to the detection of the fault condition external to the driver module by the error flag interface block, the fault condition indicated by an error flag state on the single terminal EF I/O,
wherein the control block is coupled to control the error flag interface block to set an error flag state on the single terminal EF I/O in response to detection of the fault condition local to driver module.

8. The system as in claim 7, wherein the fault condition bus is a single wire bus.

9. The system of claim 7, wherein the fault condition local to the driver module is selected from the group consisting of over-current, over-voltage, and over-temperature.

10. The system of claim 7, wherein the error flag interface block is coupled to respond to a reset state on the single terminal EF I/O and coupled to the control block to allow the output of the driver module to switch.

11. The system of claim 10, further comprising a system controller coupled to the fault condition bus, wherein the system controller is coupled to set the reset state and to receive the error flag state.

12. The system of claim 7, wherein the driver module is a half-bridge inverter.

13. The system of claim 7, wherein the driver module is a 3-phase motor drive inverter.

14. The system of claim 7, wherein the driver module is a driver and power switch in a single package.

15. A method for error reporting by a driver module having a single terminal EF I/O coupled to a fault condition bus, the method comprising:
responding to a fault condition indicated by an error flag interface block of the driver module;
inhibiting switching of an output of the driver module by a control block in response to the fault condition occurring external to the driver module indicated by receiving an external flag at the single terminal EF I/O; and
asserting an error flag state on the single terminal EF I/O by the error flag interface block in response to the fault condition being detected local to the driver module.

16. The method of claim 15, wherein the fault condition being detected local to the driver module is selected from the group consisting of over-current, over-voltage, and over-temperature.

17. The method of claim 15, further comprising:
responding to a reset state of the error flag by the error flag interface block; and
allowing the control block to switch the output of the driver module.

18. The method of claim 17, further comprising:
receiving the error flag state by a system controller coupled to the fault condition bus; and
setting a reset state on the single terminal EF I/O of the driver module by the system controller.

19. The method of claim 17, further comprising:
responding to a removal of the local fault condition; and
deasserting the error flag state of the single terminal EF I/O by the driver module, wherein the deasserting the error flag state corresponds to the reset state.

* * * * *